United States Patent
Houck et al.

(10) Patent No.: US 7,660,243 B2
(45) Date of Patent: Feb. 9, 2010

(54) METHOD FOR MANAGEMENT OF VOICE-OVER IP COMMUNICATIONS

(75) Inventors: David J. Houck, Colts Neck, NJ (US); Huseyin Uzunalioglu, Red Bank, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1190 days.

(21) Appl. No.: 10/951,429

(22) Filed: Sep. 28, 2004

(65) Prior Publication Data
US 2006/0067298 A1    Mar. 30, 2006

(51) Int. Cl.
*H04J 1/16* (2006.01)

(52) U.S. Cl. .................... 370/230; 370/230.1; 370/231; 370/232; 370/233; 370/234; 370/235; 370/395.2; 370/395.21

(58) Field of Classification Search ................ 370/230, 370/230.1, 231–235, 395.2, 395.21
See application file for complete search history.

(56) References Cited

U.S. PATENT DOCUMENTS

| | | | | |
|---|---|---|---|---|
| 5,521,905 | A * | 5/1996 | Oda et al. ................... | 370/232 |
| 6,215,768 | B1 * | 4/2001 | Kim ........................... | 370/230 |
| 2003/0081593 | A1 * | 5/2003 | Yoo ........................... | 370/352 |
| 2006/0002297 | A1 * | 1/2006 | Sand et al. .................. | 370/235 |

FOREIGN PATENT DOCUMENTS

| | | |
|---|---|---|
| EP | 0 999 674 A | 5/2000 |
| EP | 1 347 603 A | 9/2003 |
| EP | 05 25 5901 | 1/2006 |

| | | |
|---|---|---|
| WO | WO 2004/057813 A | 7/2004 |

OTHER PUBLICATIONS

Houck D. Meempat G.: "Call admission control and load balancing for voice over IP" Elsevier Science B.V.—Performance Evaluation, No. 47, 2002, pp. 243-253, XP002360605.

Bukkonprasert A et al: "Performance comparison of CAC schemes using limited access probability in two-type traffic environments" Advanced Communication Technology, 2004. The 6th International Conference on Phoenix Park, Korea Feb. 9-11, 2004, Piscataway, NJ, USA, IEEE, vol. 2, Feb. 9, 2004, pp. 665-669, XP010701158 ISBN: 89-5519-119-7.

(Continued)

*Primary Examiner*—Fan Tsang
*Assistant Examiner*—Akelaw A Teshale
(74) *Attorney, Agent, or Firm*—Wall & Tong, LLP

(57) ABSTRACT

Method for admitting new voice calls to a VoIP network. Various points in the network are polled to generate a link utilization parameter. Parameters denoting threshold values of link utilization in the network are compared to the link utilization parameter. A first comparison is made between a first (current) link utilization parameter and first and second link utilization threshold parameters. Then, a second comparison is made between the current link utilization parameter and a second (previous) value of link utilization. A calculation of new calls allowed into the network is performed based on these comparisons and whether the current level of link utilization is rising or falling when compared to a previous level of link utilization.

22 Claims, 7 Drawing Sheets

OTHER PUBLICATIONS

Szabo I: "Performance Evaluation of a New End-to-end Measurement Based Call Admission Control Scheme for Supporting IP Telephony" Proceedings of the Symposium of Performance Evaluation of Computer and Telecommunication Systems, XX, XX, Jul. 15, 2001, pp. 498-505, XP009020891.

Blake, et al., "An Architecture for Differentiated Services", RFC 2475, Dec. 1998.

Rosen, et al., "Multiprotocol Label Switching Architecture", RFC 3031, Jan. 2001.

Houck and Meempat, "Call Admission Control and Load Balancing for Voice Over IP", Performance Evaluation, 243-253, 2002.

Bernet, et al., "A Framework for Integrated Services Operation over Diffserv Networks", RFC 2998, Nov. 2000.

Davie, et al., "An Expedited Forwarding PHB (Per-Hop Behavior)", RFC 3246, Mar. 2002.

Grossman, "New Termination and Clarifications for Diffserv", RFC 3260, Apr. 2002.

Heinanen, "Assured Forwarding PHB Group", RFC 2597, Jun. 1999.

Jacobson et al., "An Expedited Forwarding PHB", RFC 2598, Jun. 1999.

Das et al., U.S. Appl. No. 10/674,123, filed Sep. 26, 2003.

Chu et al., U.S. Appl. No. 10/674,885, filed Sep. 30, 2003.

* cited by examiner

METHOD FOR MANAGEMENT OF VOICE-OVER IP COMMUNICATIONS

FIELD OF THE INVENTION

The invention relates to the field of communications systems and more specifically to the Quality of Service (QoS) management and admission control for voice calls of varied classifications in a voice-over IP (VoIP) network.

DESCRIPTION OF THE BACKGROUND ART

Traditionally, voice calls are transported entirely over the end-to-end, circuit-based Public Switched Telephone Network (PSTN). However, considerable attention has been directed toward the implementation of real-time communication across computer data networks, and particularly the ability to route voice traffic over these networks. Interest has also been raised in using Voice over IP (VoIP) solutions to facilitate voice communication between originating and terminating PSTN end points and enterprise or private network end points served by PSTN Switches, Private Branch Exchanges (PBX), or IP end points in Local Area Networks (LAN) via the Internet or private IP network. Using a private IP network or Internet for long haul routing substantially bypasses the PSTN. When bypassing a PSTN, pulse code modulated (PCM) voice traffic is processed into IP (or ATM) packets, transported over the private IP network or Internet (or ATM network), and then processed back to PCM voice. To facilitate such call routing, originating and terminating End Office (EO) switches are connected to PSTN/IP (or PSTN/ATM) gateways that reside as hosts on the IP (or ATM) network.

Unfortunately, when a new VoIP telephone voice call is established (with the intent of it being routed over the IP network), there are no means to evaluate the level of congestion of the core IP network. In other words, it is possible to have too many new voice calls being introduced to the network at the same time so that the core IP network is overloaded. Under such a condition, it is highly likely that packets of information that contain the voice data will either be dropped, or delayed from arriving at the destination. These conditions result in poor Quality of Service (QoS) of the network.

The problem of QoS is further compounded when the communication network must handle voice calls of different priority levels or classifications, which exist, for example, in a Defense Switched Network (DSN). That is, there is a need to provide a differentiation in quality based on the priority level of the call as well as provide quality to all calls in the system. The highest priority calls, for instance, must not be blocked, and must receive the best voice quality, even during traffic overloads and IP network congestion. These types of conditions can arise during crisis or partial network failures. For example, existing architectures tend to drop established calls (i.e., calls of lower precedence) to increase network resources for use by higher priority calls. This process is disruptive and not user-friendly.

SUMMARY OF THE INVENTION

Various problems in the prior art are addressed by a method for determining how to admit to a network, employing VoIP, new calls based on link utilization of various links in the network. Parameters denoting threshold values of link utilization in the network are compared to parameters indicative of actual link utilization levels. A calculation of what fraction of new calls can be allowed into the network is performed based on these comparisons and whether the current level of link utilization is rising or falling when compared to a previous level of link utilization. This two-fold aspect of making comparisons increases the flexibility of the network to adapt to changing conditions therein.

More specifically, in one embodiment of the invention, various links in the network are polled to determine their corresponding level of link utilization to generate a link utilization parameter. A first comparison is made between a first (current) link utilization parameter and first and second link utilization threshold parameters. In one example, the first and second link utilization threshold parameters denote a low link utilization threshold and a high link utilization threshold, respectively. Depending upon the results of the comparisons, either an allowed call value is assigned to the network or a second comparison is made. The second comparison is made between the current link utilization parameter and a second (previous) value of link utilization. Depending upon the results of this second comparison, the allowed call value is either adjusted to compensate for an increase or decrease in link utilization or the allowed call value remains unchanged from it previous value. The allowed call value can either be implemented as a fraction of all call attempts or as a fixed rate. New calls are subsequently admitted to the network based upon the allowed call value rather than have a continuing number of calls enter the network at the expense of a "dropped" call elsewhere in the network to provide the necessary bandwidth. The method can be practiced in a variety of different networks including PSTN-based systems with IP-related components interfaced therein, end-to end IP networks and networks having to serve users with different levels of network usage priority or authorization levels.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The subject invention is adapted to assist in establishing and/or managing of VoIP traffic in a network (for example an Internet Protocol (IP) network) by, illustratively, monitoring criteria indicative of the importance of a new voice call entering the network, and network capacity and the like. Accordingly, exemplary telecommunications systems are described as potential environments in which the subject invention may be utilized.

Figure 1:
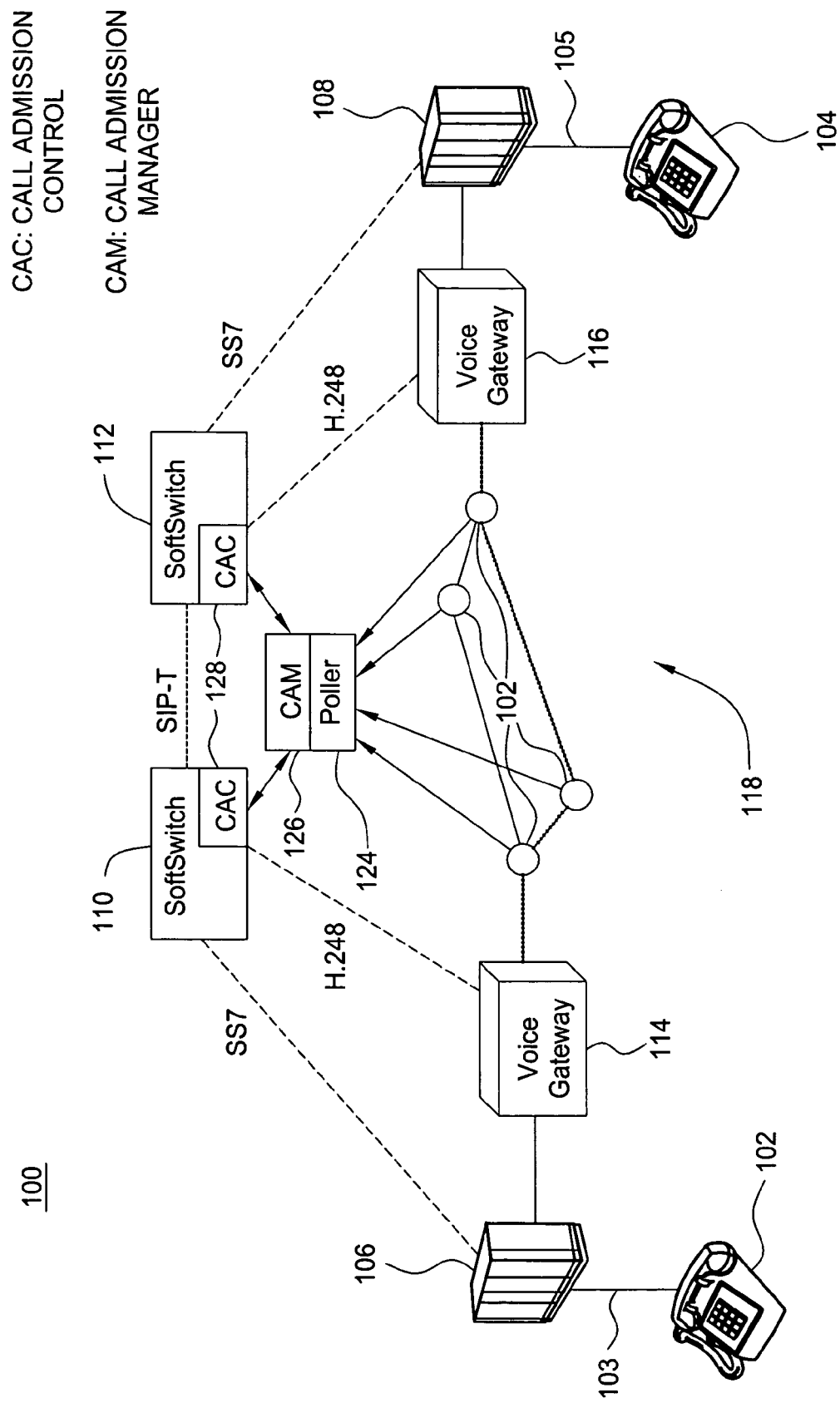
FIG. 1 depicts a first system architecture for practicing VoIP call admission in accordance with an embodiment of the subject invention.

FIG. 1 depicts an exemplary telecommunications system 100 for routing telephone calls between at least a first wire line subscriber 102 and at least a second wire line subscriber 104. The telecommunication system is an enhanced PSTN-based system. That is, telephone calls are routed across a supplementary intermediate data network 118 implementing a network layer protocol and/or (such as IP) a link layer protocol (such as asynchronous transfer mode (ATM) instead of or in addition to a series of previously existing switches).

The telecommunications system 100 of FIG. 1 includes a first subscriber end office unit 106 connected to the first subscriber 102 and a second end office 108 connected to the second subscriber 104 via conventional local loop subscriber lines (103 and 105, respectively). For example, such first subscriber line 103 and second subscriber line 105 would typically be implemented using two-element twisted pair wires carrying analog information or basic rate ISDN digital information.

Communication paths are established using the data network 118 and bypassing some PSTN related components by connecting the first end office 106 to a first gateway 114 and likewise connecting the second end office unit 108 to a second gateway 116. First and second gateways 114 and 116 respectively reside as hosts on the network 118. The gateways enable VoIP services to the first wire line subscriber 102 and second wire line subscriber 104 communicating over the network 118. When utilizing the data network 118 between the first wire line subscriber 102 and the second wire line subscriber 104, traffic is routed from the first end office 106 and second end office 108 to the respective gateways 114 and 116 for routing across various locations or nodes 120 in the data network 118.

A first softswitch 110 is connected to the first subscriber end office unit 106 and first gateway 114. A second softswitch 112 is connected to the second subscriber end office unit 108 and second gateway 116. The softswitches 110 and 112 coordinate with their respectively connected gateways to synchronize the signals requested to start data transfer from the gateways to the data network 118. A Poller 124 is connected to the various nodes 120 in the network 118 and to the softswitches 110 and 112. Within the Poller 124 is a Call Admission Manager (CAM) 126. Within each softswitch 110 and 112 is a Call Admission Controller (CAC) 128. Depending on the implementation, the CAC 128 can be a standalone device or may be implemented within the gateways 114 and 116. The CAC's 128 and CAM 126 each execute specific and dedicated algorithms in order to monitor the status of links in the network 118 and admit new calls to the network accordingly. The details of CAC and CAM algorithms are described in David Houck and Gopal Meempat, "Call admission control and load balancing for voice over IP", Performance Evaluation Vol. 47, No. 4, March 2002, Pages: 243-253 herein incorporated by reference in its entirety.

Figure 4:
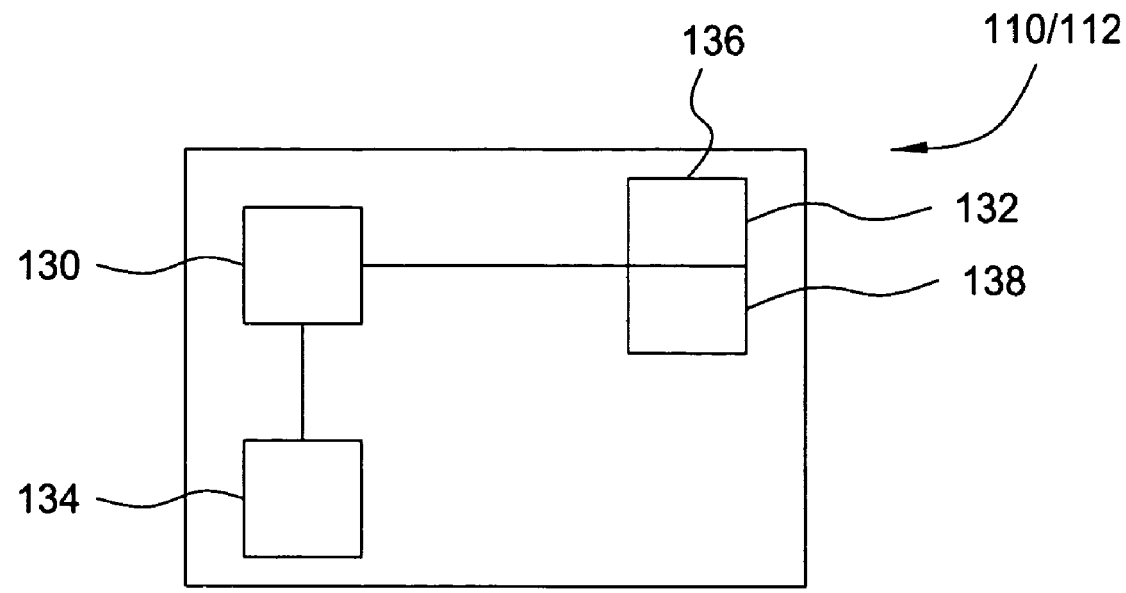
FIG. 4 depicts detailed view of call admission and call management modules associated with an embodiment of the subject invention.
Figure 4:
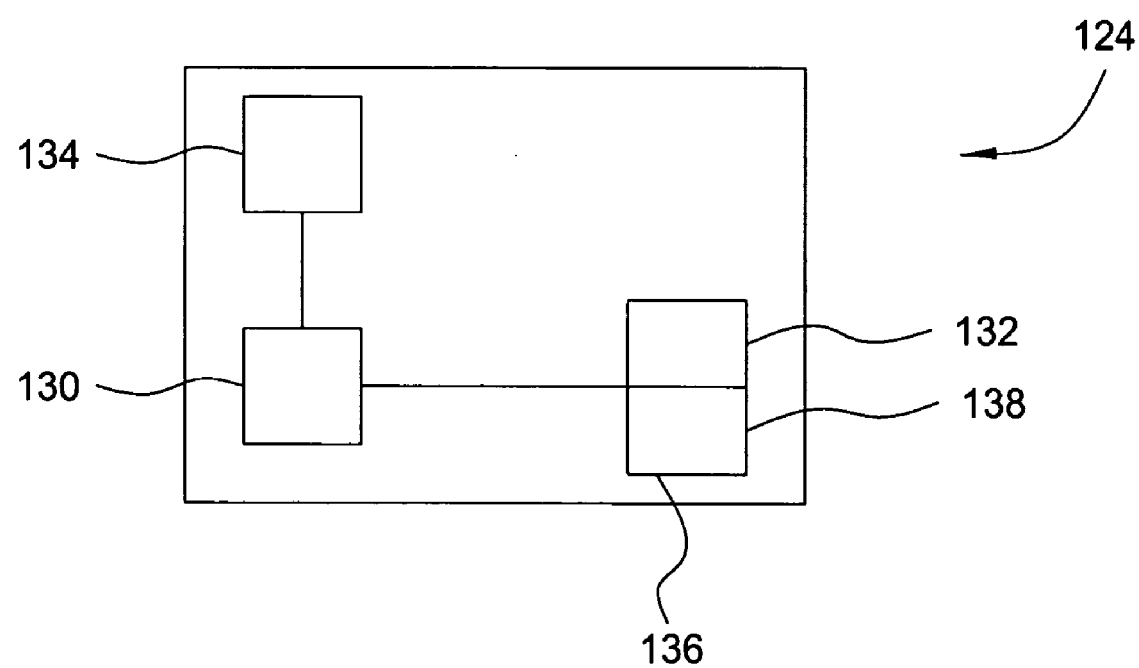

FIG. 4 details the internal circuitry of the softswitches 110 and 112, as well as the poller 124. Specifically, the softswitches 110 and 112 and poller 124 each comprise at least one central processing unit (CPU) 130, support circuits 134, and memory 136. The CPU 130 may comprise one or more conventionally available microprocessors. The support circuits 134 are well known circuits that comprise power supplies, clocks, input/output interface circuitry and the like.

Memory 136 may comprise random access memory, read only memory, removable disk memory, flash memory, and various combinations of these types of memory. The memory 136 is sometimes referred to as main memory and may in part be used as cache memory or buffer memory. The memory 136 stores various software packages 132 and 138 that dictate call admission policies in the CAC 128 and CAM 126 modules respectively.

Figure 2:
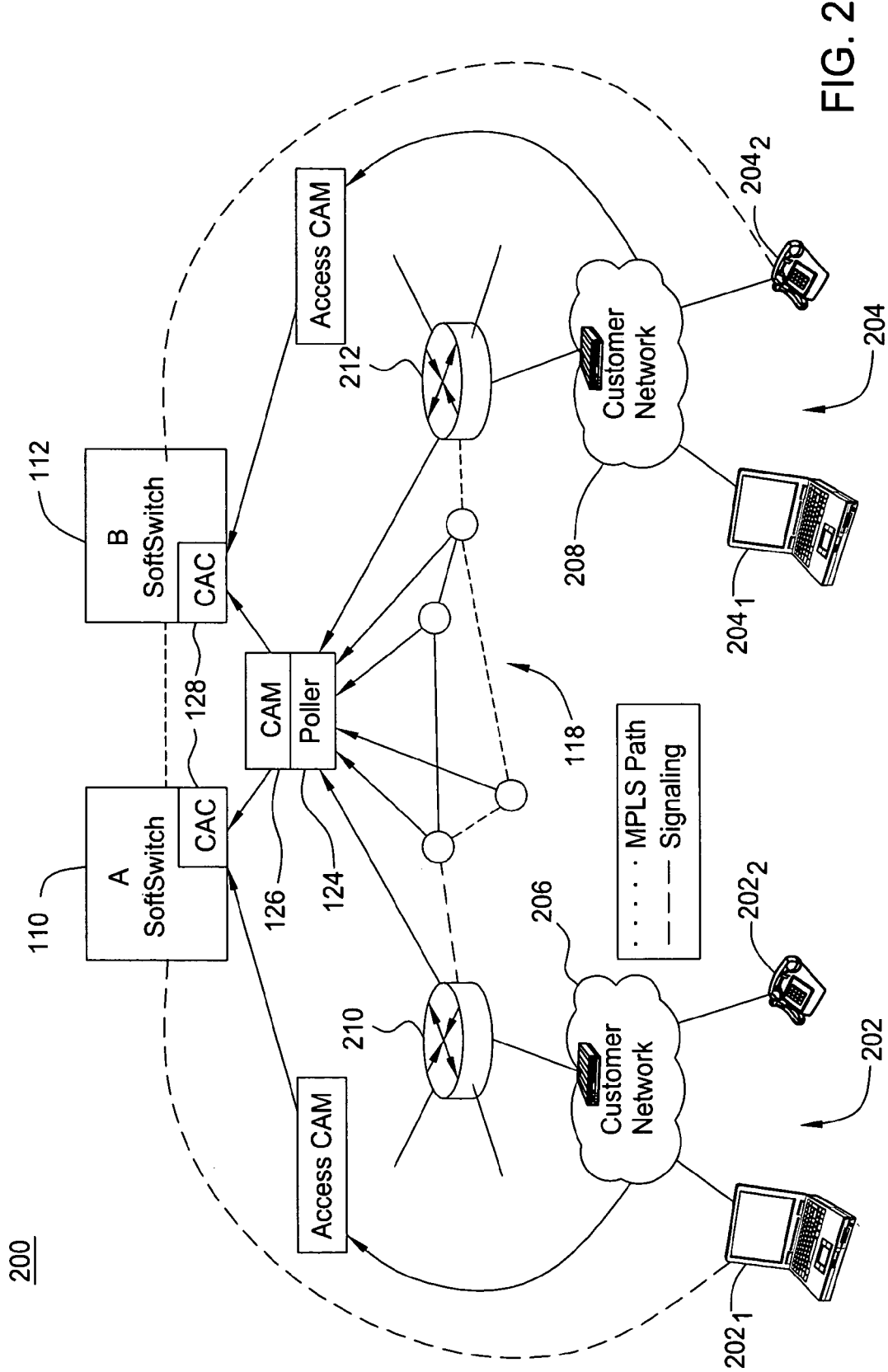
FIG. 2 depicts a second system architecture for practicing VoIP call admission in accordance with an embodiment of the subject invention.

FIG. 2 depicts an exemplary end-to-end VoIP network system 200 (i.e., there are little or no PSTN-related components). The end-to-end VoIP network system 200 has similarities to the PSTN based telecommunications system 100 and the specific distinctions are described below. Specifically, instead of first and second wire line subscribers 102 and 104, the end-to-end VoIP system 200 contains first IP customer 202 and second IP customer 204. Each of said IP customers 202 and 204, respectively, will have one or more customer devices, which may be selected from the group consisting of an IP phone, an IP soft client based component in a laptop, or other wired or wireless communication device $202_n$ and $204_n$. Each of the IP customer devices are linked to the intermediate data network 118 via a local first customer network router 206 and a second customer network router 208, respectively. Each of the customer network routers 206 and 208, respectively, are connected directly to the intermediate data network 118 via first edge router 210 and second edge router 212, respectively. The first edge router 210 and second edge router 212 are logically connected to the Poller 124. In similar fashion to the PSTN-based communications network 100, softswitches 110 and 112 are logically connected to the Poller 124 as well as to subscriber components such as IP subscriber components 202 and 204.

In either of the communication systems 100 or 200, a new voice call is admitted into the network via a path and at a time when the congestion levels that exist in the network are sufficiently below system limits to allow the call and to allow it at a sufficient data rate to provide continuing quality of service for the new call as well as all existing calls in the network. In one embodiment, the CAC 128 and CAM 126 are responsible for managing these tasks as described in the above-cited reference and also as discussed in co-pending patent application Ser. No. 10/674,885 filed Sep. 30, 2003 and Ser. No. 10/674,123 filed Sep. 26, 2003 herein incorporated by reference in its entirety.

Figure 5:
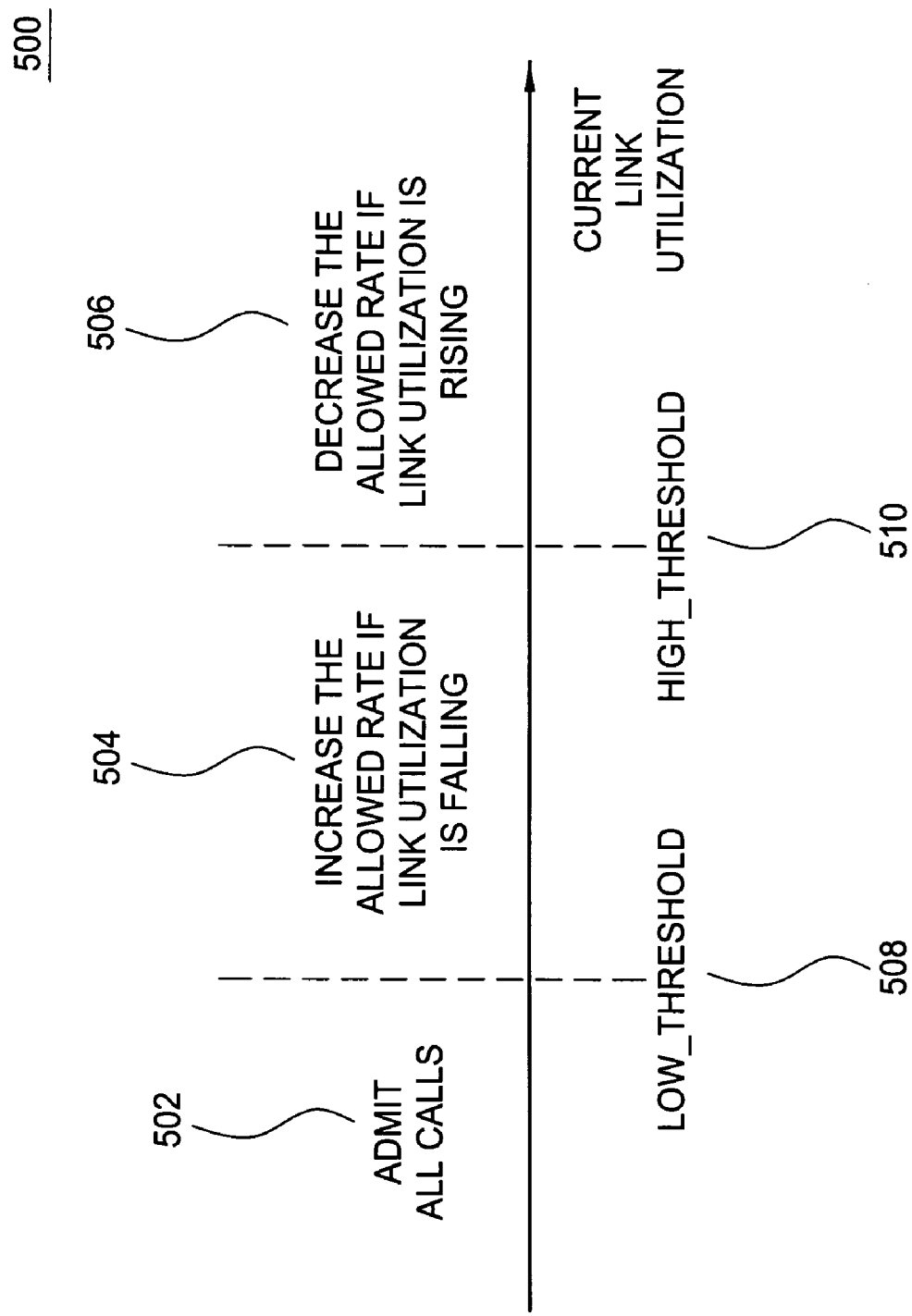
FIG. 5 depicts a chart of link utilization and dynamic policy states in accordance with an embodiment of the subject invention.

The basic theory of operation of the subject invention is depicted in the chart 500 of FIG. 5. In general, a measurement of link utilization in the network (i.e., for every link) is determined. Based on the link utilization and whether such utilization is increasing or decreasing, a determination is made as to the rate at which new voice calls are admitted into the network. The rate is expressed, in one embodiment, as a fraction of all new calls attempting to enter the network. The chart 500 is a measure of the current link utilization in the network and is divided by two boundaries to define three decision regions. Specifically, a first region 502 and a second region 504 are defined as, respectively, regions below and above a first threshold level 508. Similarly, second region 504 and a third region 506 are defined as, respectively, regions below and above a second threshold value 510.

In one embodiment of the invention, first threshold value 508 is defined as a low threshold, wherein if current link utilization is below the low threshold all new calls coming into the network will be admitted, thereby defining a policy of the first region 502. In such an embodiment, the second threshold 510 is defined as a high threshold, wherein if current link utilization is above the high threshold value, a decrease in the allowed rate of new calls entering the network occurs if the link utilization is rising, thereby defining third decision region 506. If current link utilization is between the lower threshold 508 and the high threshold 510, an increase in the allowed new call rate into the network is permitted if the link utilization is falling, thereby defining second decision region 504. The conditional aspects of second region 504 and third region 506 allow for greater flexibility in the call admission policy of the network. That is, call admission policies are not dictated strictly upon a set value or threshold level of link utilization, but also upon whether the link utilization rate is rising or falling. This provides for an extra level of flexibility and adaptability within the network so that an optimum number of new calls can be administered by the network.

As discussed earlier with respect to FIG. 5, the subject invention operates in one embodiment to increase the blocking probability of a new call when the congestion is severe, as defined by the current link utilization being higher than a "high threshold." When the link utilization is less than a "low threshold," all call set-up requests are accepted. When the link utilization is between the two thresholds, the blocking probability is reduced if the link utilization is falling. Depending on the movement of the utilization level, the blocking probability can also be kept constant. This methodology applies to all access network technologies including DSL, cable, Ethernet, and wireless as long as there is access control via Softswitch or some other vehicle.

Figure 3:
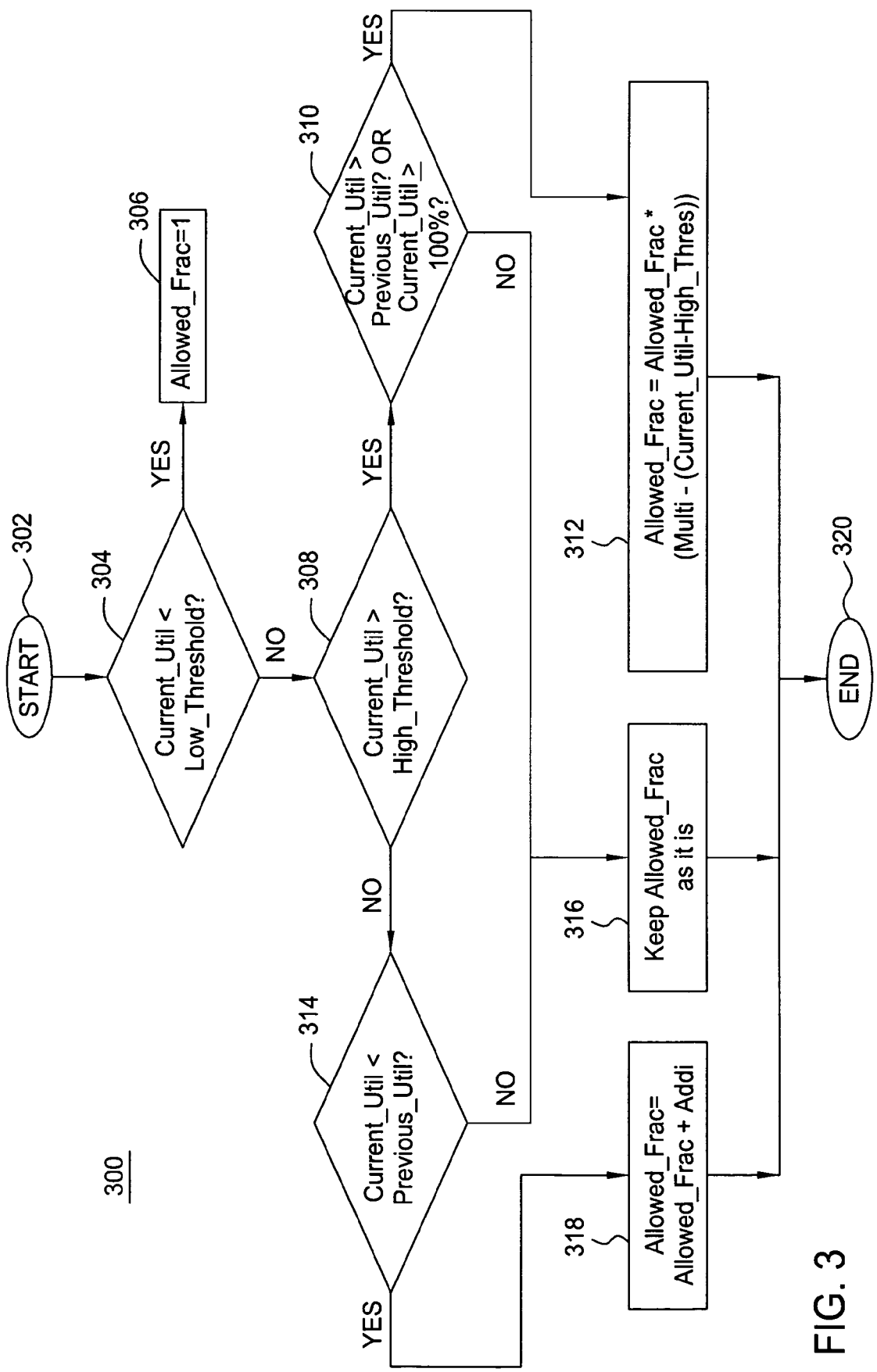
FIG. 3 depicts a series of method steps for practicing VoIP call admission in accordance with an embodiment of the subject invention.

In greater detail and with specific regard to the subject invention, FIG. 3 depicts a series of method steps 300 that the CAM 126 follows to establish a dynamic call policy for the softswitches 110 and 112 to handle calls. The method 300 requires evaluation of a plurality of parameters in accordance with, illustratively, the chart 500 of FIG. 5. Table 1 identifies a plurality of dynamic CAM policy parameters and their definitions suitable for use in the present invention. Other policy parameters may also be employed.

TABLE 1

| | |
|---|---|
| Allowed_Frac | Allowed fraction of the offered load—1 − Blocking Probability |
| Current_Util | Current utilization measurement |
| Previous_Util | Previously measured utilization |
| Low_Threshold | Lower bound of congested link utilization |
| High_Threshold | Upper utilization bound to apply additive increase |
| Mult | Fixed multiplicative decrease factor |
| Addi | Additive increase factor |

The method 300 starts at step 302 and proceeds to step 304, where the CAM 126 receives polled information from various locations 120 in the network 118 regarding link utilization for voice for all links. In one embodiment, polling is performed at intervals in the range of approximately 10-60 seconds and preferably approximately every 30 seconds.

Once this information is received, step 304 executes a decision wherein the current link utilization value is compared to the low threshold value. If the current utilization value is less than the low threshold value, the method proceeds to step 306 where the dynamic CAM policy parameter Allowed_Frac is set equal to 1 (which effectively means that no calls are blocked from entering the network). If the current utilization value is greater than the low threshold value, the method proceeds to step 308.

At step 308, the current link utilization value is compared to the high threshold value. If the current link utilization value is higher than the high threshold value, then the method proceeds to step 310. At step 310, a determination is made as to whether the current link utilization value is greater than the previous link utilization value or if the current link utilization value is greater than or equal to 100% of the link utilization capacity of the network. Utilization values greater than 100% are possible since this measure includes dropped packets. If the current link utilization value does not satisfy either of the conditions of decision step 310, the method proceeds to step 316 where the dynamic CAM parameter Allowed_Frac retains its current value. If the current link utilization value satisfies the requirements of decision step 310, the method proceeds to step 312 where the dynamic Cam parameter value Allowed_Frac is evaluated as follows:

$$Allowed\_Frac = Allowed\_Frac * (Mult - (Current\_Util - High\_Thres))$$

Returning to step 308, if the current link utilization value is not greater than the high threshold level value, then the method proceeds to step 314 where, the current link utilization value is compared to the previous link utilization value. If the current link utilization value is not less than the previous link utilization value, the method proceeds to step 316 where, as indicated earlier, the value of the dynamic CAM parameter Allowed_Frac remains as it currently is. If the current link utilization value is less than the previous link utilization value, the method proceeds to step 318 where the value of Allowed_Frac is updated as follows:

$$Allowed\_Frac = Allowed\_Frac + Addi$$

The method ends as step 320.

The CAM 126, in effect, gathers information from the network routers providing link and process utilizations that enables a call blocking policy (the throttling mechanism for the incoming calls based on the link utilization) in the CAC. Since the CAM 126 is a network function, it also enables changing the blocking policy variables via network management interfaces. The function of the CAC 126 is distributed in the softswitches 110/112 or gateways 114, 116 where it is either integrated into the call processing logic or hosted on an adjunct processor or is standalone implemented on a server. More specifically, the role of the CAM 126 is to periodically poll IP routers in the network 118 using, for example, SNMP to receive utilizations of the voice traffic class at each link. The CAM 126 is aware of existing MPLS paths throughout the network 118. This information can also be collected through SNMP polling. Thus, the CAM 126 can relate a congested link to a set of network paths that use the congested link. Hence, whenever a congested link is detected, the CAM 126 prepares a policy for all paths going through this link, and sends the policy to the CAC 128, which is located in a one of the soft switches 110/112. For example, a policy can be "Block x % of new call set-up requests between network ingress A and network egress B." A CAC database in a particular softswitch contains blocking policy only for a subset of paths, the ones involving gateways/edge routers controlled by that softswitch. During call processing, the softswitch 110/112 looks into the CAC database to determine if the call is to be allowed or blocked. Alternately, the CAM 126 can send link status information (acquired prior to step 304) and let the CAC 128 perform the policy decision that is best for the current update period.

There is no per-call interaction between the softswitch 112 and the CAM 126, or per-call computations. The logic of the CAC/CAM algorithms follows these three steps, executed in sequence, once every T seconds (referred to as the update interval):

1. Update the link utilization database in the CAM 124. This is accomplished by receiving traffic measurement reports for all IP routers, once every T seconds.
2. Compute the admission control and load balancing decisions to be used by the softswitches 112 until the next update.
3. Disseminate the control decisions to the softswitches 112 where they are executed for each new call arrival, until the next update is received.

It should be noted that these controls can be computed and disseminated asynchronously. That is, the CAM can poll a link's status, and if changed, can immediately update the path's policy that use that link and send out a new policy to the softswitch. There is no need to wait to poll all the links first.

As an additional feature, each new call entering the network can optionally be assigned a call-level and a packet-level priority based upon a priority scale. As this new call enters the communication system 100 or 200, said call is processed in such a manner as to evaluate its priority level and its destination to determine whether said call has priority over an existing call already at the destination. Based on said new call priority, the quality of said new call is also processed so that a higher priority call receives better quality of service than a call of lower priority already existing on the network. New originating calls of higher priority reaching a destination with an existing in-progress call of lower relative priority will also preempt said lower priority existing call. Details of the call prioritization are presented in U.S. patent application Ser. No. 10/674,123 filed Sep. 26, 2003 as identified above.

In detail, management of new voice calls in accordance with the subject invention utilizes both packet- and call-level controls. At the packet level, Differentiated Services (DiffServ) and Multi-Protocol Label Switching (MPLS) technologies assign multiple priorities or levels to voice calls and isolate voice traffic from data and other traffic types. DiffServ is generally discussed in "An Architecture for Differentiated Services" by Blake, et al., RFC2475, December, 1998 and MPLS is generally discussed in "Multiprotocol Label Switching Architecture" by Rosen et al, RFC 3031, January 2001, both herein incorporated by reference in their entireties. For example, calls above a "Routine" level do not experience any call blocking. They receive priority treatment from the routers within the network; thus, experience little, if any, packet loss. The "Routine" calls experience call blocking during network congestion. The Diffserv marking of the packets reflects packet level priorities; hence, the routers can offer preferential treatment for high priority call types. This guarantees that even during heavy traffic overloads, the packets of priority calls receive adequate service. The "Routine" calls may experience small amounts of packet loss; however, VoIP calls can tolerate packet loss values of 1-3%. For emergency purposes, even 5-10% packet loss is considered acceptable.

This elasticity in packet network capacity leads to a new class of admission control algorithms. Different priorities in the packet-level are implemented by putting voice traffic into a Diffserv Assured Forwarding (AF) service class and using a drop precedence to distinguish priority levels. As an example, by using the AF class for multi-precedence voice in our solution, one can use the AF1 service class for voice with all voice priority classes sharing the same queue and bandwidth. From there, different drop precedence markings could be used to distinguish the priority classes as shown in Table 2. Each priority level could have different lower and upper thresholds S08 and S10 of FIG. 5 to further optimize the network.

TABLE 2

| Priority Level | Marking |
| --- | --- |
| Flash and Flash Override | AF11 |
| Intermediate and Priority | AF12 |
| Routine AF | AF13 |

Since there are relatively few high priority calls entering a given network, the high priority calls will rarely lose packets and receive excellent voice quality.

Call-level control mechanisms are activated to limit additional voice traffic into congested links. This is achieved through the novel measurement-based admission control algorithm that combines useful features of Diffserv and MPLS. The framework is based on using DiffServ to allocate bandwidth for voice traffic on each link and MPLS to specify the routing of voice packets. This way, when congestion is detected at a given link, one can block new set up requests for calls whose packets would go through the congested link.

The policies received from the CAM 126 are applied by the CAC 128 until new policies are received. Note that in one embodiment of the invention, these policies are only applied to the "Routine" level calls. However, different policies can be applied to other call levels, i.e., Intermediate and Priority, for added system flexibility. This framework enables high precedence calls to "soft-preempt" lower precedence calls on congested links. For example, when a high precedence call is admitted into a congested link, the "Routine" precedence traffic experiences higher delays and possibly higher packet losses while the high precedence traffic receives sufficient service since this traffic is carried using higher priority packets. Since new "Routine" calls will be blocked under severe congestion, any overload situation will be alleviated quickly. This is superior to dropping an already existing low precedence call immediately as is done in the PSTN networks, since the low precedence users can tolerate some performance degradation.

The subject invention is designed for flexibility in that it will work in different types of communication networks such as those described above. If the network in which the subject invention operates is dedicated exclusively for voice traffic, the method proceeds in the manner described above. If the communication network has different types of traffic (i.e., voice traffic and data traffic) traveling along the same communication paths, the invention operates along the service classes reserved for voice traffic to practice the invention. Specifically, in multi-traffic environments, a classification system (for example, DiffServ) is used to separate the voice traffic from the data traffic. The two types of classes used are identified in the Standards IETF RFC 2998 "A Framework for Integrated Services Operation over Diffserv Networks", Y. Bernet, P. Ford, R. Yavatkar, F. Baker, L. Zhang, M. Speer, R. Braden, B. Davie, J. Wroclawski, E. Felstaine. November 2000; IETF RFC 3246 "An Expedited Forwarding PHB (Per-Hop Behavior)", B. Davie, A. Charny, J. C. R. Bennet, K. Benson, J. Y. Le Boudec, W. Courtney, S. Davari, V. Firoiu, D. Stiliadis. March 2002; RFC 3260 "New Terminology and Clarifications for Diffserv", D. Grossman. April 2002; IETF RFC 2597 and IETF RFC 2598 as Assured Forwarding (AF) and Expedited Forwarding (EF) PHB. Those skilled in the art will readily note that the classifications indicated are but one example of how different types of traffic can be assigned to DiffServ classes. Depending on the applications and their requirements in the multi-traffic network, different assignments will best serve in satisfying the QoS requirements.

Figure 6:
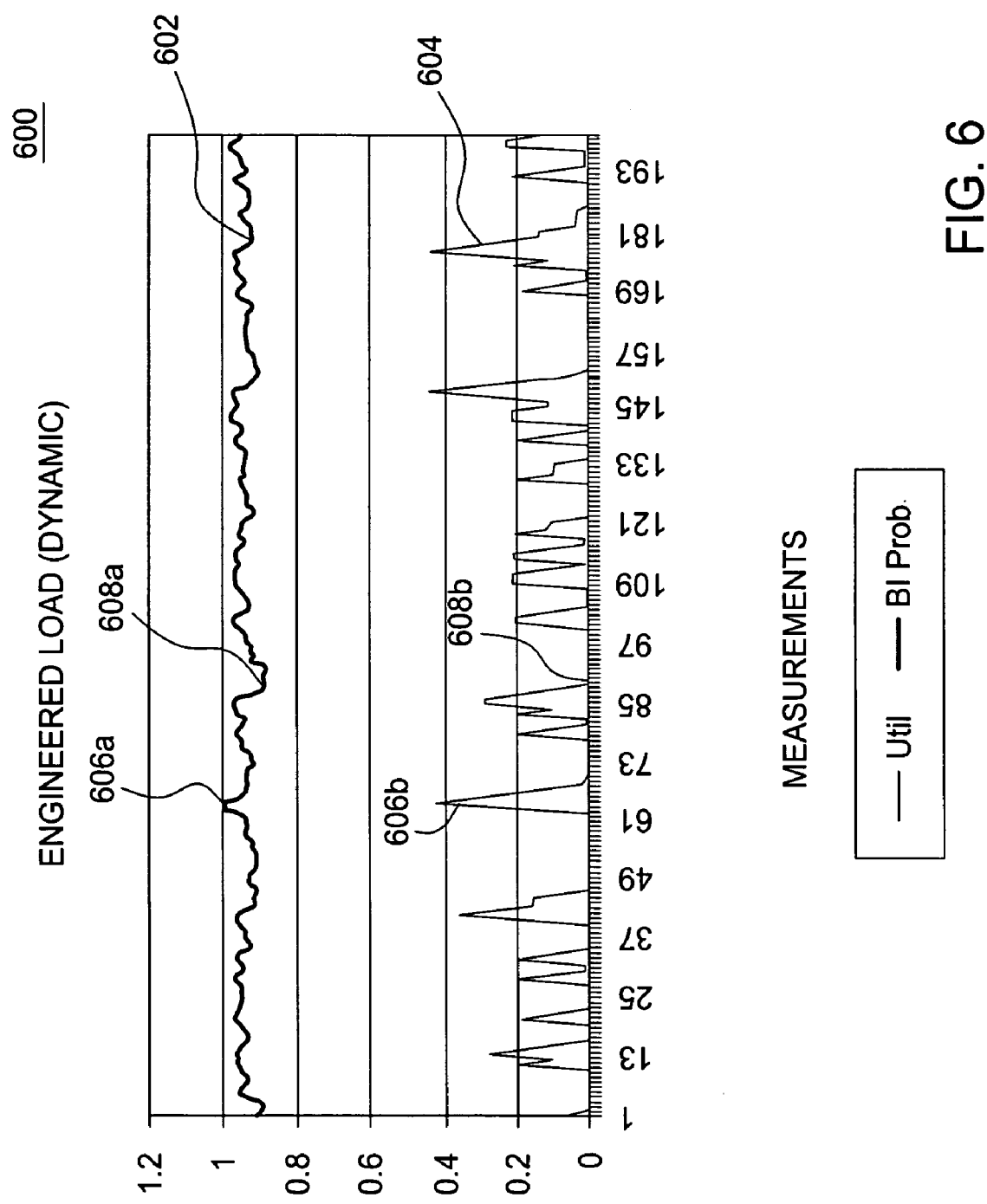
FIG. 6 depicts a graph of link utilization measurement vs. blocking probability for a first network condition when executing an embodiment of the subject invention.
Figure 7:
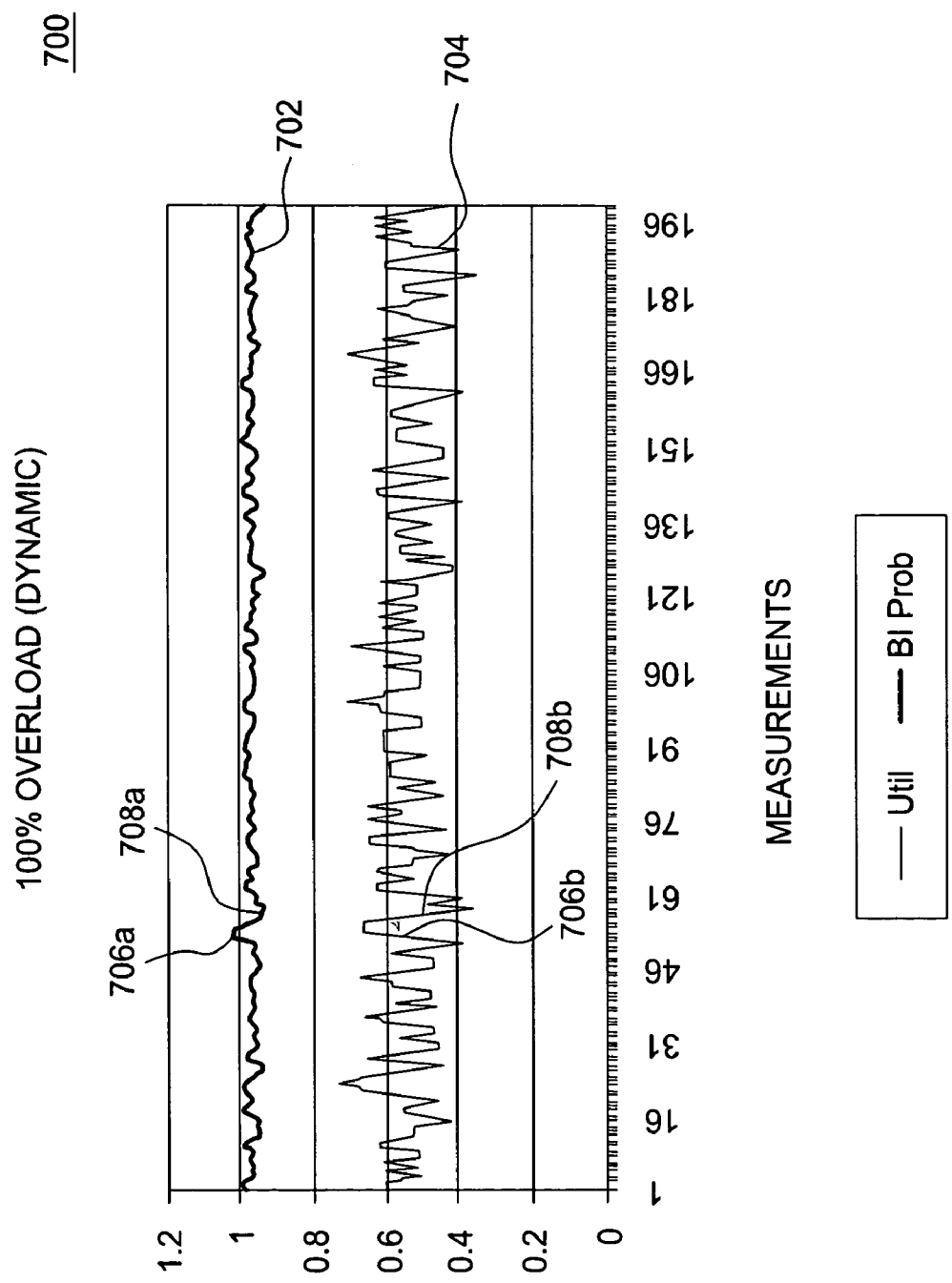
FIG. 7 depicts a graph of link utilization measurement vs. blocking probability for a second network condition when executing an embodiment of the subject invention.

Results of the dynamic policy algorithm are shown in FIGS. 6 and 7. Specifically, FIG. 6 depicts a graph 600 of link utilization and blocking probabilities for a specific number of measurements (polling intervals) when the network utilizing the dynamic policy is at the engineered load. Similarly, FIG. 7 depicts a graph 700 also depicting utilization and blocking probabilities versus measurements when the network utilizing the dynamic policy is at 100% overload. In each of the graphs 600 and 700 the upper most curve 602/702 respectively measures link utilization, while the lower curve 604/704 respectively measures blocking probability. When the policy is in operation in a network that is operating at its expected or engineered load per FIG. 6, as the number of new calls attempting to enter the network increases thus increasing link utilization, there is a spike at point 606A in the engineered load curve which, via the dynamic policy algorithm, results in a corresponding increase in blocking probability of calls at point 606B. Conversely as the blocking probability takes effect and less calls are introduced to the network, there is a decrease in the link utilization, such as at point 608A, which results in a corresponding drop in the necessary blocking probability at point 608B. Similar cause and effect relationships are seen in FIG. 7 when the network is at 100% overload. For example, as link utilization temporarily exceeds a certain value at point 706A, there is a corresponding increase in the blocking probability as seen at point 706B. Conversely, as the link utilization drops below a certain level at point 708A, there is a corresponding decrease in the blocking probability of new calls entering as seen at point 708B. The primary difference between curves 604 and 704 being that curve 704 is at a relatively higher blocking probability because the network managing the new voice calls is already at an overload condition; thus, operating at a higher blocking probability level in general. For each of the graphs, the measurements are in the form of polling intervals and in these particular examples, show the results of 200 polling intervals which is approximately 100 minutes of network operation.

Although various embodiments which incorporate the teachings of the present invention have been shown and described in detail herein, those skilled in the art can readily devise many other varied embodiments that still incorporate these teachings.

We claim:

1. A method of voice over IP call admission in a network, comprising:
   (a) receiving a first parameter indicative of a level of link utilization in said network;
   (b) comparing said first parameter to at least one threshold parameter indicative of link utilization capacity;
   (c) comparing said first parameter to a second parameter indicative of a previous level of link utilization in the network when the first parameter exceeds a first of the at least one threshold parameters; and
   (d) determining an allowable call value in response to said parameter comparisons.

2. The method of claim 1 wherein a value of the first parameter is based on information received from polling one or more locations in the network.

3. The method of claim 1 wherein the network is an enhanced PSTN network.

4. The method of claim 3 wherein the enhanced PSTN network further comprises at least two IP gateways interfacing with respective PSTN endpoints and an intermediate IP network.

5. The method of claim 1 where the network is an end-to-end IP network.

6. The method of claim 1 wherein the step of comparing said first parameter to at least one threshold parameter indicative of link utilization capacity further comprises comparing the first parameter to the first threshold parameter indicative of link utilization capacity and a second threshold parameter indicative of link utilization capacity.

7. The method of the claim 6 where the first threshold parameter indicative of link utilization capacity is a low threshold and the second threshold parameter indicative of link utilization capacity is a high threshold.

8. The method of the claim 7 wherein the low threshold parameter has a value of approximately 88% of the capacity of the link utilization.

9. The method of the claim 7 wherein the high threshold parameter has a value of approximately 96% of the capacity of the link utilization.

10. The method of claim 1 wherein the step of comparing said first parameter to a second parameter indicative of a previous level of link utilization in the network if the first parameter exceeds a first of the at least one threshold parameters further comprises determining if the first parameter is less than a value of a parameter indicative of a previous level of link utilization.

11. The method of claim 10 wherein if the first parameter is less than a value of a parameter indicative of a previous level of link utilization, then the allowable call value is calculated as:

$$Allowed\_Frac = Allowed\_Frac + Addi$$

where:
   Allowed_Frac is an allowable fraction of calls, and
   Addi is an additive factor to increase the allowable fraction of calls.

12. The method of claim 10 wherein if the first parameter is not less than a value of a parameter indicative of a previous level of link utilization, then the allowable call value remains at its current value.

13. The method of claim 10 wherein the step of comparing said first parameter to a second parameter indicative of a previous level of link utilization in the network if the first parameter exceeds a first of the at least one threshold parameters further comprises determining if the first parameter is greater than a value of a parameter indicative of a previous level of link utilization or greater than or equal to 100% of link utilization.

14. The method of claim 13 wherein if the first parameter is greater than a value of a parameter indicative of a previous level of link utilization or greater than or equal to 100% of link utilization, then the allowable call value is calculated as:

$$Allowed\_Frac = Allowed\_Frac * (Mult - (Current\_Util - High\_Thres))$$

where:
   Allowed_Frac is an allowable fraction of calls,
   Mult is a multiplicative decrease factor,
   Current_Util is the first parameter, and
   High_Thres is one of the threshold parameters.

15. The method of claim 13 above wherein if the first parameter is not greater than a value of a parameter indicative of a previous level of link utilization or not greater than or equal to 100% of link utilization, ten the allowable call value remains at its current value.

16. A computer readable medium containing a program which, when executed, performs an operation of admitting of voice over IP calls in a network the operation comprising:
   (a) receiving a first parameter indicative of a level of link utilization in said network;

(b) comparing said first parameter to at least one threshold parameter indicative of link utilization capacity;

(c) comparing said first parameter to a second parameter indicative of a previous level of link utilization in the network when the first parameter exceeds a first of the at least one threshold parameters; and (d) determining an allowable call value in response to said parameter comparisons.

17. The computer readable medium of claim 16 wherein the step of comparing said first parameter to a second parameter indicative of a previous level of link utilization in the network if the first parameter exceeds a first of the at least one threshold parameters further comprises determining if the first parameter is less than a value of a parameter indicative of a previous level of link utilization.

18. An apparatus for facilitating voice over IP call admission in a network, comprising:

means for receiving a first parameter indicative of a level of link utilization in said network;

means for comparing said first parameter to at least one threshold parameter indicative of link utilization capacity;

means for comparing said first parameter to a second parameter indicative of a previous level of link utilization in the network when the first parameter exceeds a first of the at least one threshold parameters; and means for determining an allowable call value in response to said parameter comparisons.

19. The apparatus of claim 18 wherein the means for receiving further comprises a Call Admission Manager Module (CAM) in communication with at least one link in the network.

20. The apparatus of claim 19 wherein the CAM receives information by polling said at least one link in the network.

21. An apparatus for facilitating voice over IP call admission in a network, comprising:

means for receiving call admission policy information based upon a first parameter indicative of a level of link utilization in said network relative to at least one threshold parameter indicative of link utilization capacity and a second parameter indicative of a previous level of link utilization in the network when the first parameter exceeds a first of the at least one threshold parameters; and means for generating an allowable call value as a function of said first parameter being compared to said at least one threshold parameter and said second parameter to arrive at the call admission policy information.

22. The apparatus of claim 21 wherein the means for receiving call admission policy information further comprises a Call Admission Control Module (CAC) in communication with a switching device in the network.

* * * * *

UNITED STATES PATENT AND TRADEMARK OFFICE
CERTIFICATE OF CORRECTION

PATENT NO. : 7,660,243 B2
APPLICATION NO. : 10/951429
DATED : February 9, 2010
INVENTOR(S) : Houck et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1534 days.

Signed and Sealed this

Twenty-eighth Day of December, 2010

David J. Kappos
*Director of the United States Patent and Trademark Office*